United States Patent [19]

Florek et al.

[11] Patent Number: 5,448,351
[45] Date of Patent: Sep. 5, 1995

[54] ECHELLE POLYCHROMATOR

[75] Inventors: Stefan Florek; Helmut Becker-Ross, both of Berlin, Germany

[73] Assignee: Bodenseewerk Perkin-Elmer GmbH, Überlingen, Germany

[21] Appl. No.: 157,034

[22] PCT Filed: Jun. 5, 1992

[86] PCT No.: PCT/EP92/01270

§ 371 Date: May 16, 1994

§ 102(e) Date: May 16, 1994

[87] PCT Pub. No.: WO92/21948

PCT Pub. Date: Dec. 10, 1992

[30] Foreign Application Priority Data

Jun. 6, 1991 [DE] Germany .................. 41 18 760.1

[51] Int. Cl.$^6$ .................. G01J 3/14; G01J 3/18; G02B 5/06
[52] U.S. Cl. .................. 356/328; 356/332; 356/334; 359/615; 359/832
[58] Field of Search .............. 356/305, 326, 328, 331, 356/332, 333, 334; 359/615, 832

[56] References Cited

U.S. PATENT DOCUMENTS

| | | | |
|---|---|---|---|
| 4,575,243 | 3/1986 | Witte | 356/333 |
| 4,820,048 | 4/1989 | Barnard | 356/328 |
| 4,995,721 | 2/1991 | Krupa et al. | 356/328 |

FOREIGN PATENT DOCUMENTS

3634485 4/1988 Germany .
2204964 4/1988 United Kingdom .

OTHER PUBLICATIONS

"High–resolution spectroscopy using an echelle spectrometer w/predisperser –I. Characteristics of instru. & approach for measurng physi line widths in inductivly coupled plasma", Spectrochimica Acta, vol. 39B, Nos. 9–11, pp. 1239–1260, 1984, P. W. J. M. Boumans and J. J. A. M. Vrakking.

"High–resolution spectroscopy using echelle spectrometer w/predisperser—II. Analytical optimization for inductively coupled plasma atomic emission spectromtry" Spectrochimica Acta. vol. 39B Nos. 9–11, pp. 1261–1290, 1984, P. W. J. M. Boumans and J. J. A. M. Vrakking.

"High–resolution spectroscopy using a echelle spectrometer w/predisperser—III. A study of line wings as a major contribution to the background in line–rich spectra emitted by a inductively coupled plasma", Spectrochimica Acta. vol. 39B. Nos. 9–11, pp. 1291–1305, 1984, P. W. J. M. Boumans and J. J. A. M. Vrakking.

Primary Examiner—F. L. Evans
Attorney, Agent, or Firm—Edwin T. Grimes

[57] ABSTRACT

An Echelle polychromator 50 has disposed upstream thereof a pre-monochromator 14 comprising a prism 20. The linear dispersion of the pre-monochromator 14 is variable by varying the angular dispersion of the prism 20. A particular spectral position and the close vicinity thereof are analyzed by an Echelle grating 54 with high resolution. Care must be taken that, on the one hand, the detector array 66 of the Echelle polychromator 50 is fully exploited in response to the central wavelength respectively observed and that, on the other hand, interfering orders are kept away from the Echelle polychromator 50. The linear dispersion of the pre-monochromator is variable for this purpose.

7 Claims, 2 Drawing Sheets

ECHELLE POLYCHROMATOR

TECHNICAL FIELD

The present invention relates to an Echelle polychromator.

A polychromator is a spectrometer in which a spectrum is produced on a detector array by a dispersion element, i.e. a row of detector elements closely arranged next to one another. In this way the spectral intensities are simultaneously measured at the different wavelengths of a wavelength range detected by the detector array. By contrast, a monochromator generates a spectrum on the plane of an exit slit. Then, light of a particular, relatively narrow wavelength range will emerge from that exit slit. The light emerging from the exit slit may then impinge onto a single detector, e.g. a photomultiplier. However, the light passing through the exit slit may be directed onto a further monochromator or polychromator. In the latter case one talks about a pre-monochromator. Pre-monochromators serve the reduction of interfering light. With grating monochromators pre-monochromators have the function of eliminating light of interfering orders.

An Echelle grating is a grating having a triangular groove profile, the spacing of the grooves thereof being large with respect to the wavelength. An Echelle grating uses high interference orders. A polychromator which operates with an Echelle grating is an Echelle polychromator.

BACKGROUND ART

Different types of monochromators and polychromators are described in a book by J. Sternberg "The Design of Optical Spectrometers", Chapman and Hall, 1969, and in a book by Y. Talmi "Multichannel Image Detectors", American Chemical Society, 1979.

U.S. Pat. No. 4,820,048 describes an Echelle polychromator combined with a novel solid-state detector array. A separation of the orders within the Echelle polychromator is performed for a simultaneous detection of the complete wavelength range. This results in a limitation in the entrance slit height. Furthermore, imaging errors arise at the end portions of the spectrum. The level of scattered light is relatively high.

GB-A-2 204 964 describes an Echelle polychromator for multiple element analysis. A light source produces a light bundle defined by two crossed entrance slits. The light bundle impinges onto a collimator mirror. The collimator mirror directs the light bundle directed in parallel through a dispersion prism onto an Echelle grating. The light bundles diffracted by the Echelle grating repass through the dispersion prism and are collected by a camera mirror onto a two-dimensional detector array. The dispersion prism effects dispersion in a direction vertical to the direction of dispersion of the Echelle grating, and thus a separation of the different orders of the Echelle grating. The detector array comprises detector elements at the locations of characteristic spectrum lines of the various chemical elements to be determined.

An Echelle monochromator is known in which the orders are separated by a pre-monochromator. The pre-monochromator produces a spectrum on the plane of an entrance slit of the high-resolution Echelle monochromator. Only a limited wavelength range of that spectrum enters into the Echelle monochromator. Then, the Echelle monochromator takes from this wavelength range a more narrow wavelength range by means of an exit slit and a detector positioned downstream thereof. Such dual Echelle monochromators achieve a high spectral resolution at an extremely small amount of stray light. A high light guide number results from the larger height of the slits. However, only one spectral position within the total spectrum can be investigated at a time (P. W. J. M. Boumans and J. J. A. M. Vrakking, "Spectrochimica Acta" Bd. 39B No. 9-11, 1239).

DE-C-3 634 485 describes a liquid prism having a variable prism angle for producing spectrally distorted photographs and projections.

DISCLOSURE OF THE INVENTION

It is the object of the present invention to provide a spectral apparatus by means of which it is possible to analyse not only a particular spectral position with high resolution but also the vicinity thereof at the same time.

According to the invention this object is attained with an Echelle polychromator which has disposed upstream thereof a pre-monochromator including a prism, with the linear dispersion of the pre-monochromator being variable.

The apparatus according to the invention uses an Echelle grating in conjunction with a linear detector array by which a plurality of wavelengths can be detected separately and simultaneously. In so far it is a polychromator. However, the apparatus is not suited for detecting a large wavelength range, such as the Echelle polychromator according to the above-mentioned GB-A-2 204 964. Rather, the Echelle grating analyses a particular spectral position and the close vicinity thereof with high resolution. For this purpose, a simple prism pre-monochromator is located upstream of the Echelle polychromator. The pre-monochromator allows only a limited spectrum range to pass to the Echelle polychromator. Care must be taken that, on the one hand, the detector array is fully exploited in response to the central wavelength respectively observed and that, on the other hand, interfering orders, i.e., light that would produce overlapping spectra of different orders on the Echelle grating, are kept away from the Echelle polychromator. For this reason, the linear dispersion of the pre-monochromator is made variable.

The present invention provides a novel apparatus which is an intermediate between a monochromator and a polychromator: The apparatus includes a monochromator, namely the premonochromator, which directs a narrow spectral range through an entrance slit of the Echelle polychromator. However, the apparatus also includes a polychromator comprising a detector array. However, the detector array analyses, with high resolution, the vicinity of a central wavelength set, not an extended full spectrum.

Embodiments of the invention are subject to the dependent claims.

Exemplary embodiments of the invention are explained in the following with reference to the accompanying drawings.

PREFERRED EMBODIMENTS OF THE INVENTION

Figure 1:
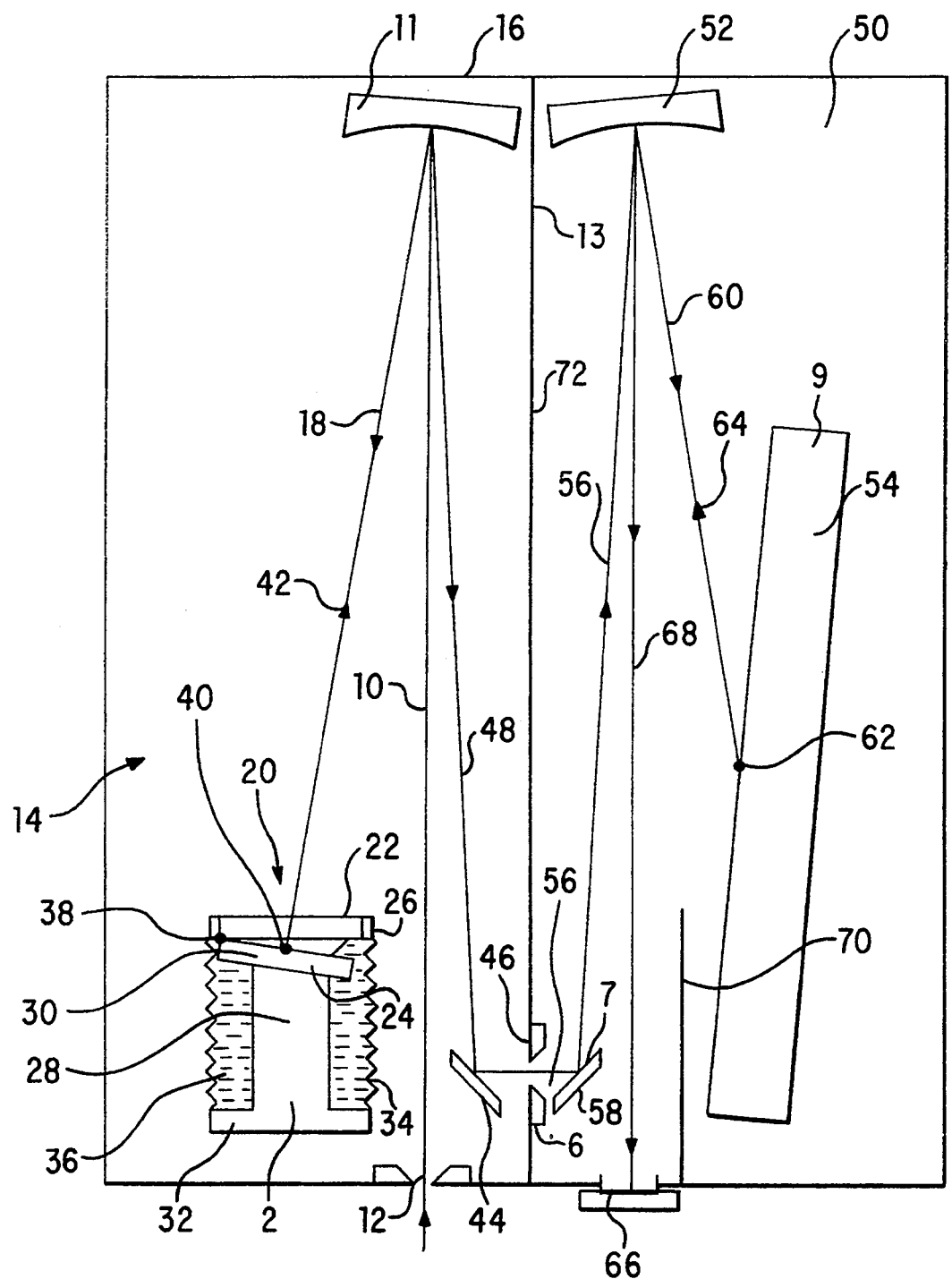
FIG. 1 is a top plan view of an Echelle polychromator comprising a prism pre-monochromator.

In FIG. 1 a light bundle 10 enters from a light source (not shown) through an entrance slit 12 of a pre-monochromator 14. The pre-monochromator 14 is a prism monochromator in the form of a Littrow arrangement. The light bundle 12 impinges onto a parabolic collimator mirror 16. The collimator mirror 16 produces a parallel light bundle 18 from the diverging light bundle 12. The parallel light bundle 18 impinges onto a prism 20.

The prism 20 is a liquid mirror prism having a variable prism angle. The prism 20 comprises a plan-parallel front plate 22 transparent for light to be analysed, and a rear plate 24. The rear plate 24 is mirror-coated on its front side 26 facing the collimator mirror 16. A mirror holder 28 is mounted on the rear plate 24. The mirror holder 28 has a cylindrical base form. The mirror holder 28 is tapered at the front surface 30 thereof facing the plates. The mirror holder 28 has a flange 32 at the opposite end thereof. A bellows 34 extends between the flange 32 and the edge of the front plate 22. A cavity 36 is defined between the plate 22, the bellows 34 and the flange 32 and around the mirror holder 28. Cavity 36 is filled with a refractive liquid. Said liquid also fills the space having a triangular cross-section between the two plates 22 and 24.

The plates 22 and 24 are pivotably connected to each other along an edge 38. Additionally, the complete prism 20 comprising the mirror holder 28 and the bellows 34 is pivotably mounted about an axis 40. The axis 40 extends parallel to the edge 38 and to the direction of the entrance slit 12. The axis 40 lies in the plane of the mirror-coated front face 26 of the plate 24.

The refractive liquid is distilled water. Distilled water has a high transmittance within the total wavelength range from 190 nm to 850 nm. The index of refraction of distilled water has only a small temperature dependence. The plate 22 consists of molten quartz. The bellows are fabricated from PTFE.

The parallel light bundle 18 will be refracted by the prism formed by the plate 22 and the liquid located between plates 22 and 24, and will spectrally be dispersed. The resultant light bundles are reflected by the mirror-coated front surface 26 of plate 24. The reflected light bundles will re-pass through prism 20 and will be subjected to a further dispersion. Then, the spectrally dispersed light bundles will pass back to collimator mirror 16, as indicated by arrow 42, and will be collected on the plane of a slit 46 by means of the collimator mirror 16 via a deflecting mirror 44. A spectrum is produced on the plane of slit 46 as an image of entrance slit 12. In FIG. 1 only the centre ray of the light bundle 48 is shown, focussed at the centre of slit 46.

The ray beam 10 enters at an aperture ratio of F/8 through the entrance slit 12 of the pre-monochromator 14. The ray beam is reflected at the parabolic collimator mirror 16 with an off-axis angle of about 8°. The collimator mirror 16 has a focal width of 400 mm.

The slit 46 allows a small spectral range to pass from the spectrum generated on the plane of slit 46. The slit 46 forms the entrance slit of an Echelle polychromator 50. The Echelle polychromator 50 includes a collimator mirror 52 and an Echelle grating 54. A diverging light bundle 46 having a narrow spectral range will emerge from slit 46. The light bundle 56 is deflected by a deflecting mirror 58 and will impinge onto collimator mirror 52. The collimator mirror 52 generates a parallel light bundle 60 from diverging light bundle 56. The parallel light bundle 60 impinges onto the Echelle grating 54. The Echelle grating is pivotable about an axis 62. The axis 62 is parallel to the grooves of the grating. The grooves of the grating are extending vertically to the surface of the paper in FIG. 1.

The Echelle grating 54 effects a decomposition of the light entering through entrance slit 46. Parallel light bundles extend in various directions from the Echelle grating, which light bundles include the different wavelengths of the spectral range isolated by the slit. The diffracted light bundles are substantially reflected in the direction of incidence onto collimator mirror 52. This is indicated by arrow 64 in FIG. 1. The light bundles including the various wavelengths will be focussed on the plane of a detector array 66 by collimator mirror 52. A spectrum will be produced on detector array 66. The spectrum extends across the detector array 66 from the left hand to the right hand side in FIG. 1. The light bundle corresponding to the centre wavelength is indicated at 68 in FIG. 1. A stop 70 shields the detector array against interfering radiation. A separator wall 72 is provided between the pre-monochromator 14 and the Echelle polychromator 50. The entrance slit 46 is provided within said separator wall 72.

The Echelle grating 54 includes a line number of 75 grooves per millimeter and a blaze angle of about 76. The Echelle grating 54 is operated close to autocollimation in view of a high diffraction efficiency. The collimator mirror 52 is a parabolic mirror having a focal width of 400 mm. The detector array is a CCD-row having 512 detector elements each of a width of 0.023 mm and a height of 0.480 mm. The slit width of the entrance slit 12 of the pre-monochromator 14 is twice as large as the slit width of the entrance slit 46 of the Echelle polychromator 50. As a consequence, the entrance slit of the Echelle polychromator 56 is completely illuminated for all wavelengths to be measured by the detector array.

A narrow wavelength range passing through slit 46 is determined by adjustment of plate 22 about axis 38 and of the mirror-coated plate 24 (together with the complete prism 20) about axis 40. The centre wavelength of that portion will be determined by the light bundle 48 reflected by the mirror-coated surface 26 of plate 24 after refraction by the prism 20. The spectral width of the wavelength range having passed through the slit is the smaller the larger the linear dispersion of the pre-monochromator is, herein therefore, the larger the angular dispersion of the prism 20 is. The angular dispersion may be increased by pivoting plate 22 with respect to plate 24. The liquid volume displaced between plates 22 and 24 or sucked in between plates 22 and 24 is compensated for by the elastic bellows 34.

The selected spectral range at the entrance slit 46 of the Echelle polychromator 50 with the selected centre wavelength and the selected spectral width is now decomposed by the Echelle polychromator with high dispersion, and a corresponding spectrum is produced on detector array 66. To this end, the Echelle grating 54 is pivoted such that the centre wavelength lies about in the centre of detector array 66. The angular dispersion of prism 20, and thereby the spectral width of the spectral range, is selected such that the length of the detector array 66 is used in an optimum way. For this purpose, the angular dispersion of prism 20 will be selected such that the following condition will be met:

$$2sg(\sin\alpha + \sin\beta)/(f_1\lambda^2) < d\delta/d\lambda$$
$$< sf^2(\sin\alpha + \sin\beta)/(lf_1\lambda\cos\beta)$$

where $d\delta/d\lambda$ is the angular dispersion of the prism, $\lambda$ is the wavelength, s is the width of the entrance slit of the Echelle polychromator, g is the grating constant of the Echelle grating of the Echelle polychromator, $\alpha, \beta$ are the entrance angle and the angle of diffraction, respectively, at the Echelle grating, $f_1$ is the focal width of the camera of the pre-monochromator, $f_2$ is the focal width of the camera of the Echelle polychromator, and l is the length of the detector array of the Echelle polychromator.

In that way it is guaranteed that the length of the detector array 66 is fully used, i.e., the wavelength range required for a complete illumination of the detector array passes through the entrance slit 46 into the Echelle polychromator, and this spectral range is smaller than the free wavelength range of the order used of the Echelle grating 54, so that there will be no overlapping of orders.

The Echelle polychromator comprising the pre-monochromator may be modified in different ways.

Figure 2:
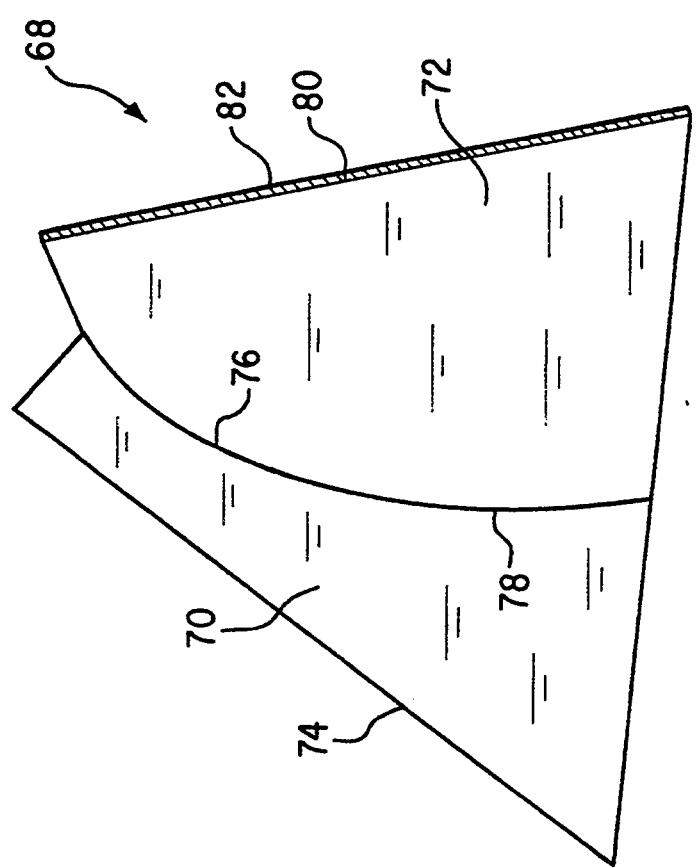
FIG. 2 shows another embodiment of a prism having a variable angular dispersion.

FIG. 2 schematically shows a modified form of the prism having variable angular dispersion for use in the pre-monochromator.

The prism 68 consists of two solid members 70 and 72 of a dispersing material transparent for the wavelength range used, such as quartz. Member 70 has a plane front surface 74. Member 70 has a concave cylindrical surface 76 at the rear side thereof. Member 72 has a convex-cylindrical front face 78 which is complementary with respect to surface 76. The surfaces 76 and 78 are in contact with each other, such that rays are passing substantially smoothly through the interface. If necessary, a liquid may be introduced between surfaces 76 and 78, the index of refraction and the dispersion of the liquid will substantially have the same magnitudes as the materials of members 70 and 72. Member 72 has a plane rear surface 80. The surface 80 is provided with a mirror coating 82. The prism angle between surfaces 74 and 80 may be varied continuously by pivoting the two members 70 and 72 relative to each other.

Instead of cylindrical surfaces, spherical surfaces can, e.g., be provided as well.

A variation of the linear dispersion of the pre-monochromator might also be achieved by varying the focal length of the imaging optics. A zoom-optics should be provided in such a case.

We claim:

1. Apparatus comprising an Echelle polychromator and a variable linear dispersion pre-monochromator positioned upstream thereof, said pre-monochromator comprising a prism, said prism having a front plate and a rear plate, said plates forming a variable angle with each other and defining therebetween a liquid-filled cavity.

2. Apparatus according to claim 1 wherein said rear plate of said prism is reflective for forming a Littrow mirror.

3. Apparatus according to claim 2 wherein said Littrow mirror and said front plate are pivotable in common so that a spectral range including a selectable centre wavelength is directed onto an entrance slit of the Echelle polychromator, angular dispersion of said prism being selected in response to said selected wavelength so that firstly a detector array of the Echelle polychromator is illuminated in an optimum way and secondly an overlapping of orders of the spectrum produced by the Echelle polychromator is excluded.

4. Apparatus according to claim 3 wherein the angular dispersion of said prism for a particular wavelength fulfills the condition $$2sg(\sin\alpha + \sin\beta)/(f_1\lambda^2) < d\delta/d\lambda$$
$$< sf^2(\sin\alpha + \sin\beta)/(lf_1\lambda\cos\beta)$$

where $d\delta/d\lambda$ is the angular dispersion of the prism, $\lambda$ is the wavelength, s is the width of the entrance slit of the Echelle polychromator, g is the grating constant of the Echelle grating of the Echelle polychromator, $\alpha, \beta$ are the angle of incidence and the angle of diffraction, respectively, on the Echelle grating, $f_1$ is the focal width of a camera of the pre-monochromator, $f_2$ is the focal width of a camera of the Echelle polychromator, and l is the length of the detector array of the Echelle polychromator.

5. Apparatus according to claim 4 wherein an entrance slit of the pre-monochromator has twice the width of an entrance slit of the Echelle polychromator.

6. Apparatus comprising an Echelle polychromator and a variable linear dispersion pre-monochromator positioned upstream thereof, said pre-monochromator comprising a prism, said prism having two solid members, one of them forming a plane front surface and the other forming a plane rear surface, said members having concave cylindrical and complementary thereto, convex cylindrical surfaces, respectively, facing each other, said surfaces being in contact with each other and allowing rotation of the two members relative to each other.

7. Apparatus comprising an Echelle polychromator and a variable linear dispersion pre-monochromator positioned upstream thereof, said pre-monochromator comprising a prism, said prism having two solid members, one of them forming a plane front surface and the other forming a plane rear surface, said members having concave spherical and, complementary thereto, convex spherical surfaces, respectively, facing each other, said surfaces being in contact with each other and allowing rotation of the two members relative to each other.

* * * * *